US008195587B2

(12) United States Patent
Aoyama

(10) Patent No.: US 8,195,587 B2
(45) Date of Patent: Jun. 5, 2012

(54) METHOD AND APPARATUS FOR CLASSIFYING AND TRANSMITTING ELECTRONIC DOCUMENTS BY STORING PRIORITIES AND CLASSIFYING RULES PERTAINING TO A DISTRIBUTION METHOD

(75) Inventor: Reiko Aoyama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 823 days.

(21) Appl. No.: 12/056,714

(22) Filed: Mar. 27, 2008

(65) Prior Publication Data

US 2009/0030866 A1    Jan. 29, 2009

(30) Foreign Application Priority Data

Jul. 26, 2007    (JP) .................................. 2007-194063

(51) Int. Cl.
*G06Q 20/00*    (2006.01)
(52) U.S. Cl. ....................................................... 706/20
(58) Field of Classification Search .................... 706/20, 706/45–48; 707/665; 358/500–540, 400–425, 358/426.01–426.16, 434–498
See application file for complete search history.

(56) References Cited

U.S. PATENT DOCUMENTS

| | | | | | |
|---|---|---|---|---|---|
| 4,885,705 | A | * | 12/1989 | Choi | 702/184 |
| 5,121,496 | A | * | 6/1992 | Harper | 1/1 |
| 5,367,619 | A | * | 11/1994 | Dipaolo et al. | 715/221 |
| 5,579,472 | A | * | 11/1996 | Keyworth et al. | 715/751 |
| 7,849,045 | B2 | * | 12/2010 | Herrera et al. | 706/59 |
| 2002/0046047 | A1 | * | 4/2002 | Budd | 705/1 |
| 2002/0049691 | A1 | * | 4/2002 | Majoor | 706/47 |
| 2005/0125746 | A1 | * | 6/2005 | Viola et al. | 715/853 |
| 2007/0115497 | A1 | * | 5/2007 | Cowburn | 358/1.14 |
| 2008/0273221 | A1 | * | 11/2008 | Couchman et al. | 358/1.15 |
| 2010/0094871 | A1 | * | 4/2010 | Ruggieri et al. | 707/737 |

FOREIGN PATENT DOCUMENTS

| | | |
|---|---|---|
| JP | 2002-117046 A | 4/2002 |
| JP | 2003-223383 A | 8/2003 |
| JP | 2004-152327 A | 5/2004 |

OTHER PUBLICATIONS

Notification of Reasons for Refusal issued Sep. 27, 2011 by the Japanese Patent Office in counterpart Japanese Patent Application No. 2007-194063.

* cited by examiner

*Primary Examiner* — David Vincent
(74) *Attorney, Agent, or Firm* — Sughrue Mion, PLLC

(57) ABSTRACT

An information classifying apparatus includes an information receiving section, a rule storing section, a deciding section, a creating condition storing section, a creating section and a storage control section. The rule storing section stores a classifying rule which is a rule for classifying a piece of information. The deciding section decides as to whether a piece of information received by the information receiving section satisfies the stored classifying rule or not. The creating condition storing section stores a creating condition which is a condition for creating the classifying rule. The creating section creates, when the deciding section decides that the piece of information does not satisfy the stored classifying rule, a new classifying rule based on the creating condition stored in the creating condition storing section. The storage control section controls the rule storing section to store the new classifying rule created by the creating section.

11 Claims, 9 Drawing Sheets

FIG. 3

| | FIRST CONDITION 310 | | | SECOND CONDITION 320 | | SETTING CONTENTS 330 | |
|---|---|---|---|---|---|---|---|
| ATTRIBUTE 311 | CONDITION 312 | 315 | ATTRIBUTE 321 | CONDITION 322 | DISTRIBUTING DESTINATION 331 | DISTRIBUTED CONTENTS 332 |
| FAX NUMBER | FAX NUMBER PROVIDED | AND | CHARACTER RECOGNITION RESULT | "URGENT" INCLUDED | MAIL SENDING | MAIL SENDING WITH APPENDIX TO bbb@xxx |
| FAX NUMBER | FAX NUMBER PROVIDED | OR | FAXID | FAXID PROVIDED | FOLDER SAVING | STORING AT SUB-FOLDER CREATED WITH FAX NUMBER |
| | | | | | | STORING AT SUB-FOLDER WITH FAX NUMBER OR FAXID |
| | | | | | NOTICE | NOTICE TO XX |
| CHARACTER RECOGNITION RESULT | "MAIL ADDRESS" INCLUDED | AND | CHARACTER RECOGNITION RESULT | "FIRM NAME" INCLUDED | MAIL SENDING | MAIL SENDING WITH URL OF SAVING DESTINATION APPENDED TO "ATTRIBUTE VALUE AT MAIL ADDRESS POSITION" |
| | | | | | FOLDER SAVING | STORING AT SUB-FOLDER CREATED WITH FIRM NAME |
| MAIL ADDRESS | TRANSMISSION DESTINATION INCLUDED | AND | APPENDED FILE | TIF-FILE APPENDED | FOLDER SAVING | AFTER PDF CONVERSION, STORING AT SUB-FOLDER WITH DESTINATION NAME |
| | | | | | NOTICE | NOTICE OF URL OF STORING DESTINATION |

PRIORITY: HIGH ← → LOW

| ADDED-BUT-NOT-SPECIFIED RULE ID | UNIT ID | JOB ID | INFORMATION ID | DISTRIBUTING DESTINATION | INFORMATION WHEN DISTRIBUTED |
|---|---|---|---|---|---|
| 001 | 009 | 0023 | 2134 | AAA | aaa |
|  |  | 0045 | 2256 |  | bbb |
|  | 067 | 0130 | 2590 | RRR | ccc |
|  |  | 0134 | 2890 |  | ddd |
|  |  | 0876 | 3769 |  | eee |
| 024 | 088 | 244 | 3290 | BBB | kkk |
|  |  | 578 | 4013 |  | yyy |

METHOD AND APPARATUS FOR CLASSIFYING AND TRANSMITTING ELECTRONIC DOCUMENTS BY STORING PRIORITIES AND CLASSIFYING RULES PERTAINING TO A DISTRIBUTION METHOD

CROSS-REFERENCE TO RELATED APPLICATIONS

This application is based on and claims priority under 35 USC 119 from Japanese Patent Application No. 2007-194063 filed Jul. 26, 2007.

1. Technical Field

This invention relates to a information classifying apparatus, a information classifying method and a computer readable medium.

2. Related Art

There are techniques for classifying a received electronic file based on a predetermined created condition.

SUMMARY

According to an aspect of the invention, an information classifying apparatus includes information receiving section, a rule storing section, a deciding section, a creating condition storing section, a creating section and a storage control section. The information receiving section receives a piece of information. The rule storing section stores a classifying rule which is a rule for classifying a piece of information. The deciding section that decides as to whether the piece of information received by the information receiving section satisfies the classifying rule stored in the rule storing section or not. The creating condition storing section stores a creating condition which is a condition for creating the classifying rule. The creating section creates, when the deciding section decides that the piece of information does not satisfy the stored classifying rule, a new classifying rule based on the creating condition stored in the creating condition storing section. The storage control section controls the rule storing section to store the new classifying rule created by the creating section.

BRIEF DESCRIPTION OF THE DRAWINGS

Exemplary embodiment(s) of the present invention will be described in detail based on the following figures, wherein

FIG. 3 is a view for explaining an example of the data structure in a rule creating table;

DETAILED DESCRIPTION

Figure 1:
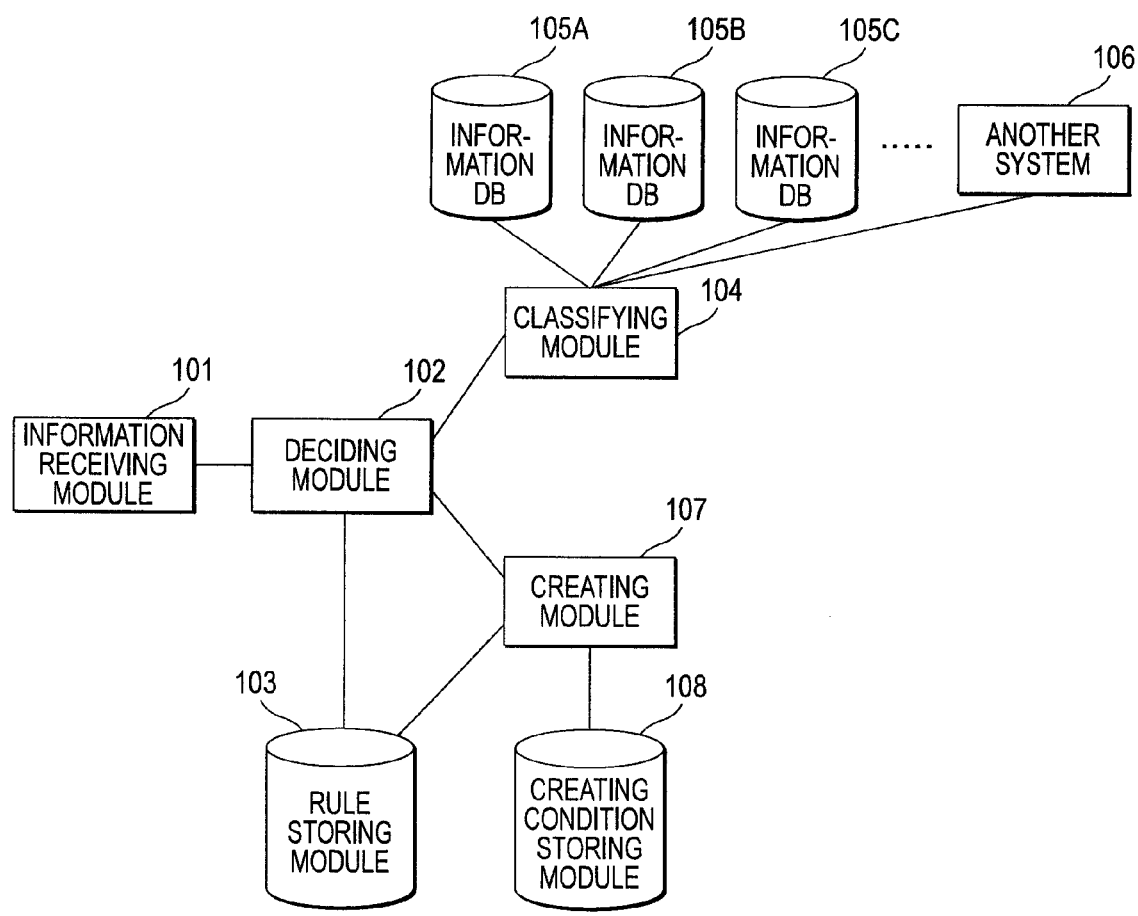
FIG. 1 is a conceptual module configuration diagram of a configuration example according to the first exemplary embodiment.

Now referring to the drawings, an explanation will be given of various exemplary embodiments in carrying out this invention.

FIG. 1 is a conceptual module configuration diagram of a configuration example according to the first embodiment.

The module generally refers to the components such as software (computer program) and hardware which are logically separated. Therefore, the module in the first exemplary embodiment refers to not only the module in the computer program but also the module in the hardware configuration. Thus, the first exemplary embodiment is also directed to explanation of the computer program, system and method. For convenience of explanation, the terms "store", "is stored" and terms similar thereto are adopted, but in the case of an embodiment of the computer program, these terms means storing in a memory or controlling to store in the memory. Further, although the module corresponds to a function in a nearly one-to-one ratio, in mounting, the one module may be constructed of one program and plural modules may be constructed of one program, and inversely, the one module may be constructed of the plural programs. Further, the plural modules may be executed by one computer, and the one module may be executed by plural computers placed in a dispersed or parallel environment. Incidentally, the one module may contain another module. Further, hereinafter, the "connection" refers to not only physical connection but also logical connection (data transmission/reception, instructions, reference between data, etc.).

Moreover, a system or apparatus refers to not only a configuration in which plural computers, pieces of hardware, devices, etc. are connected by a communicating section such as a network (including communication connection with the correspondence in one-to-one ratio), but also to the configuration constructed of a single computer, a single piece of hardware, a single device, etc.

The module configuration according to the first exemplary embodiment, as shown in FIG. 1, includes a information receiving module 101, a deciding module 102, a rule storing module 103, a classifying module 104, a information DB (data base) 105, another system 106, a creating module 107 and a creating condition storing module 108.

The information receiving module 101 is connected to the deciding module 102 and receives the piece of information to be classified. Now, the piece of "information" is an object to be processed by the computer, for example, concretely, a file, an electronic document created by document creating software, image data, etc. The information receiving module 101 may receives plural pieces of information. Each piece of information may contain image data, audio data, moving image data, etc. as well as character data. Further, receiving of the piece of information includes reading the piece of information stored in e.g. a hard disk (which is incorporated in the computer or connected via the network), receiving the image data (information) inputted by e.g. a scanner, and receiving the image data (information) by a facsimile.

The deciding module 102 is connected to the information receiving module 101, classifying module 104 and creating module 107 and accesses the rule storing module 103. The deciding module 102 decides whether or not the piece of information received by the information receiving module 101 satisfies the classifying rule stored in the rule storing module 103 and transmits the control to the classifying module 104 or creating module 107 according to the decision result. Namely, if the classifying rule is satisfied, the piece of information received by the information receiving module 101 is transmitted to the classifying module 104 and classified according to the classifying rule. On the other hand, if the classifying rule is not satisfied, a new classifying rule is created by the creating module 107.

The rule storing module 103 is accessed by the deciding module 102 and the creating module 107 and stores the classifying rule which is a rule for classifying piece of information.

The classifying module 104 is connected to the deciding module 102, a information DB 105A, a information DB 105B, a information DB 105C and the other system 106. The classifying module 104, if it is decided by the deciding module 102 that the classifying rule is satisfied, receives the piece of information received by the information receiving module 101 and classifying rule from the deciding module 102 and transfers the piece of information to the information DBs 105 or the other system 106 according to the classifying rule.

The information DB 105A, information DB 105B, information DB 105C and another system 106 are connected to the classifying module 104, respectively. The information DBs 105 and the other system 106 receive the piece of information from the classifying module 104 and store it, respectively.

The creating module 107 is connected to the deciding module 102 and accesses the rule storing module 103 and creating condition storing module 108. The creating module 107, if it is decided by the deciding module 102 that the classifying rule is not satisfied, creates a new classifying rule based on the creating condition stored in the creating condition storing module 108 and causes the rule storing module 103 to store the classifying rule thus created.

The creating condition storing module 108 is accessed by the creating module 107 and stores the creating condition which is a condition for creating the classifying rule.

Figure 2:
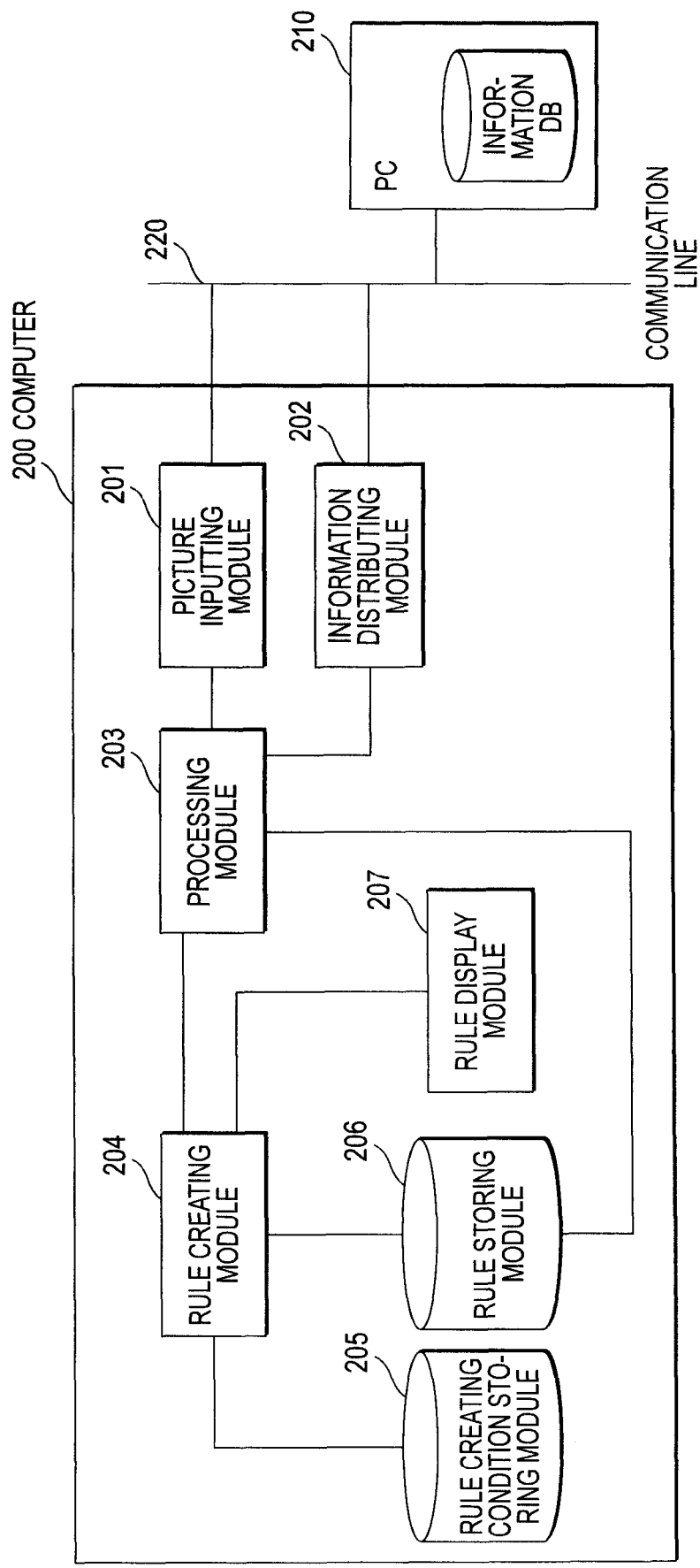
FIG. 2 is a module configuration diagram of a more concrete configuration of the first exemplary embodiment.

Referring to FIG. 2, an explanation will be given of a more concrete configuration of the first exemplary embodiment. Now, it is assumed that the piece of information is picture data, and the configuration is mounted in a computer 200.

The computer 200 includes a picture input module 201, a information distributing module 202, a processing module 203, a rule creating module 204, a rule creating condition storing module 205, a rule storing module 206 and a rule display module 207.

The picture input module 201 is connected to the processing module 203 and a PC 210 via a communication line 220. This picture input module 201 corresponds to the information receiving module 101 shown in FIG. 1. More concretely, the picture input module 201 monitors a monitored destination based on the classifying rule to be processed by the processing module 203. When the picture data are inputted to the monitored destination, the picture input module 201 transfers the picture data to the processing module 203.

The information distributing module 202 is connected to the processing module 203, and connected to the PC 210 via the communication line 220. This information distributing module 202 corresponds to the classifying module 104 shown in FIG. 1. More concretely, the information distributing module 202 distributes the picture data to a distributing destination designated by the processing module 203.

The processing module 203 is connected to the picture input module 201, information distributing module 202, rule creating module 204 and rule storing module 206. This processing module 203 corresponds to the deciding module 102 shown in FIG. 1. More concretely, the processing module 203 processes an inputted job based on the contents of the classifying rule. Further, the processing module 203 holds the attribute information of the job extracted during the processing. If the job not agreeing with the distributing condition is inputted, the processing module 203 transfers the acquired job attribute to the rule creating module 204 and job-processes under the condition after rule adding processing.

The rule creating module 204 is connected to the processing module 203, rule creating condition storing module 205, rule storing module 206 and rule display module 207. This rule creating module 204 corresponds to the creating module 107 shown in FIG. 1. More concretely, based on the rule creating condition stored in the rule creating condition storing module 205, the rule creating module 204 creates, as a classifying rule, the monitored destination of the picture input module 201, a processing method, a distributing method, a distributing condition and the contents of the attribute to be extracted in processing the job and saves the classifying rule in the rule storing module 206. Namely, when the job not agreeing with the classifying condition registered in the rule storing module 206 is inputted, based on the rule creating condition stored in the rule creating condition storing module 205, the rule creating module 204 adds a condition to the classifying rule to be modified and saves the modified classifying rule in the rule storing module 206. When the job not agreeing with the condition is inputted, based on the rule creating condition stored in the rule creating condition storing module 205, the rule creating module 204 creates a classifying rule from the job attribute received from the processing module 203.

The rule creating condition storing module 205 is accessed by the rule creating module 204 and stores the condition for creating the classifying rule by the rule creating module 204.

The rule storing module 206 is accessed by the processing module 203 and rule creating module 204, and stores the classifying rule for classifying the picture received. The rule storing module 206 further stores the classifying rule newly created by the rule creating module 204.

The rule display module 207 is connected to the rule creating module 204 and presents the classifying rule created by the rule creating module 204 to an operator. More concretely, the rule display module 207 controls the indication on the display connected to the computer 200.

The PC 210 is connected, via the communication line 220, to the picture input module 201 and the information distributing module 202 of the computer 200. This PC 210 corresponds to the information DB 105 or another system 106 shown in FIG. 1. The picture data received are stored in the information DB within the PC 210.

Next, the function and operation of the first exemplary embodiment will be explained.

First, an explanation will be given of the processing in a preparing stage in processing the picture data in the first exemplary embodiment.

(1) In the rule creating module 204, a rule creating condition is set when the inputted job does not agree with the using conditions. This setting is carried out according to the operation by the operator.

(2) The rule creating condition is set in order of higher priority and contains the condition to be created for the attribute which is an object of the condition. The rule creating condition is a rule for creating the classifying rule and so-called "meta" rule.

Referring to FIG. 3, an explanation will be given of the data structure and concrete examples of a rule adding condition.

A rule creating condition table 300 includes a first condition column 310, an operation column 315, a second condition column 320 and a setting content column 330. The first condition column 310 has an attribute column 311 and a condition column 312. The second condition column 320 has an attribute column 321 and a condition column 322. The setting content column 330 has a distributing destination 331 and a distributing content column 332. On the rule creating condition table 300, the first row is the highest priority and the subsequent rows have lower priority in order.

The contents of the first condition column 310 and second condition column 320 are conditions when the creating rule is applied. Another condition, i.e. a third condition and others may be added and only the first condition may be presented. The contents of the operation column 315 are relationships (logical operation) when the first condition and the second condition are applied. As the contents of the attribute columns 311 and 321, a FAX number (telephone number), a FAXID (identifier capable of identifying the FAX device of a transmitting source), a character recognition result, a mail address, an appended file, etc. are designated. As the contents of the condition columns 312 and 322, the corresponding attribute columns 311 and 321 are designated.

Further, the contents of the setting content column 330 are rules for creating the classifying rule when the inputted job agrees with the contents of the first condition column 310 and second condition column 320. Specifically, according to the contents of the distributing destination column 331, the distributing destination, i.e. the classifying destination of the picture data is designated, and according to the contents of the distributed content column 332, the specific distributed contents are designated. As the contents of the distributing destination column 331, mail sending, folder saving, notification, etc. are designated. As the contents of the distributed content column 322, a mail sending destination, a mail sending with the picture data as an appended file, storage with a designated folder name, contents to notice, conversion processing of the picture data, etc. are designated.

For example, the first rule creating condition on the rule creating condition table 300 includes the first condition and the second condition. The contents of the first condition have the attribute of a FAX number, and condition of presence of the FAX number. Logical Operation is AND between the first condition and the second condition. The contents of the second condition are the attribute of character recognition result (character recognition result of the picture data) and condition of inclusion of a character "urgent". If the job agrees with these conditions, in the setting contents of the classifying rule the distributing destination is mail transmission, the distributed contents are the mail transmission to bbb@xxx with appended picture data, and storage of the picture data in a sub-folder created at the FAX number.

Figure 4A:
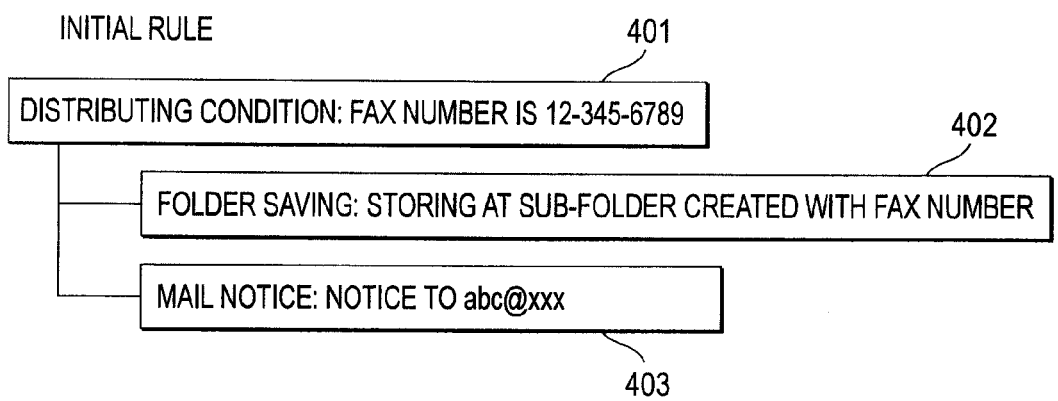
FIGS. 4A-4B are views for explaining an example of the data structure of a classifying rule.
Figure 4B:
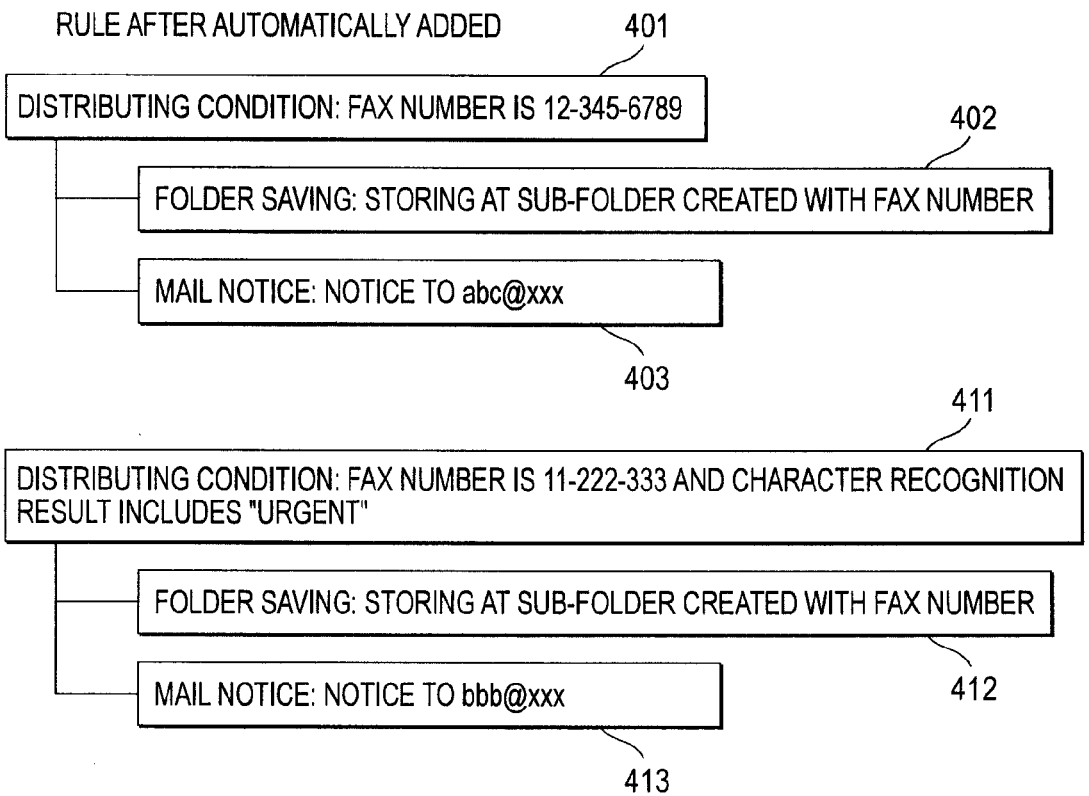

Referring to FIGS. 4A and 4B, an explanation will be given of an example of the classifying rule stored in the rule storing module 206.

FIG. 4A indicates an example of the classifying rule stored in the rule storing module 206 and previously created by the operator. The classifying rule is formed in a tree structure which has the condition and processing when the job agrees with the condition. In the example of FIG. 4(A), the classifying rule have a distributing condition 401 as the condition, and folder saving 402 and mail notice 403 as the processing. In the example of FIG. 4A, the condition for applying the classifying rule is "distributing condition: FAX number is 12-345-6789". If the job agrees with this condition, the classifying rule is to carry out "folder saving: storage in a sub-folder created at the FAX number" and "mail notice: notice to abc@xxx".

FIG. 4B indicates the state in the rule storing module 206 after the classifying rule has been newly created by the rule creating module 204 from the state of FIG. 4A. There are the classifying rule of a distributing condition 411 to mail notice 413 as well as the classifying rule of the distributing condition 401 to the mail notice 403. Namely, newly added are the distributing condition 411 as the condition and the classifying rule of the folder saving 412 and mail notice 413 as the processing when the job agrees with the condition.

Figure 5:
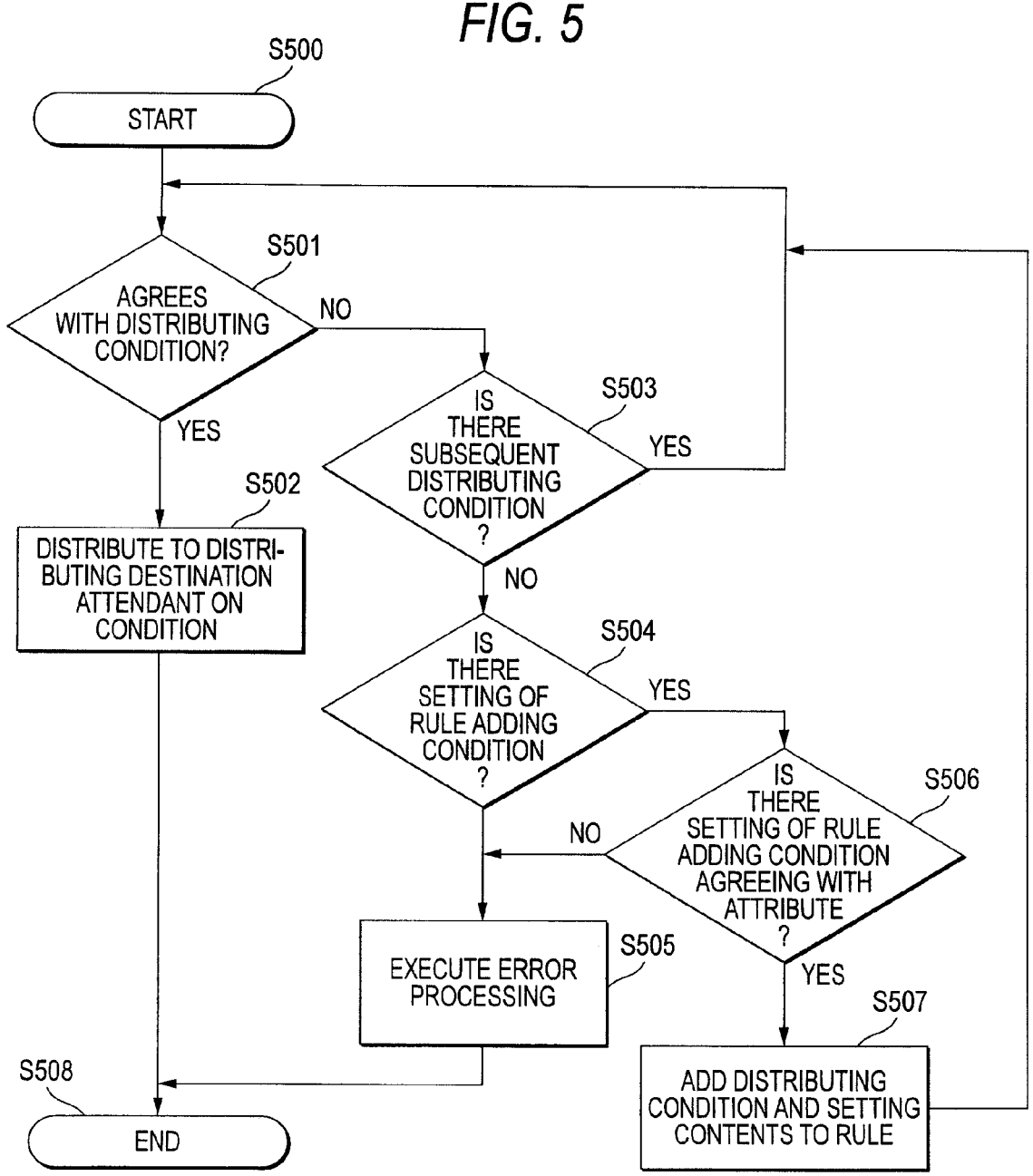
FIG. 5 is a flowchart showing a processing example according to the first exemplary embodiment.

Hereinafter, referring to the flowchart of FIG. 5, an explanation will be given of the processing (centering on the processing for creating the classifying rule) in the first embodiment.

First, the picture input module 201 receives picture data from the other system via the communication line 220 and transfers the picture data to the processing module 203.

The processing module 203 processes the picture data received based on the classifying rule stored in the rule storing module 206.

In step S501, in the processing based on the classifying rule, the processing module 203 decides whether or not the inputted job agrees with the distributing condition set in the classifying rule.

In such a decision, if the job agrees with the distributing condition (YES), the processing proceeds to step S502. In the other cases (NO), the processing proceeds to step S503.

In the case of the job not agreeing with the distributing condition, the acquired attribute(s) and rule ID being processed are transferred to the rule creating module 204. The acquired attributes are e.g. the FAX number, a character string containing "urgent" as the character recognition result, a document name, etc.

Now, the "job" is defined by a user and refers to a unit of work (classifying processing) executed by the computer (including the apparatus according to the first exemplary embodiment). The expression of the job is a collection of a computer program, a file, an operation system control statement, etc.

In step S502, the processing module 203 executes the processing based on the classifying rule. Namely, using the information distributing module 202, the processing module 203 distributes the picture data to the distributing destination corresponding to the distributing condition decided in step S501. For example, the processing module 203 creates the sub-folder with the name of the FAX number at a transmission source in the PC 210 and stores the picture data in the sub-folder. The processing module 203 notifies abc@xxx that the picture data are received and stored.

In step S503, the processing module 203 decides whether or not there is the distributing condition which is a part of a next classifying rule. If there is the distributing condition (YES), the processing returns to step S501. In the other case (NO), the processing proceeds to step S504. Namely, the case where the processing proceeds to step S504 is the case where an applicable classifying rule does not exist within the rule storing module 206.

In step S504, the rule creating module 204 decides whether or not there is setting of a rule adding condition. Namely, the rule creating module 204 decides whether or not the rule creating condition table 300 exists within the rule creating condition storing module 205. If there is setting of a rule adding condition (YES), the processing proceeds to step S506. In the other case (NO), the processing proceeds to step S505.

In step S505, the rule creating module 204 indicates for the operator that the classifying rule to be applied did not exist and the new classifying rule could not be created. For example, this fact may be displayed on the display connected to the computer 200.

In step S506, the rule creating module 204 compares the attribute acquired in step S501 with the condition on the rule creating condition table 300 within the rule creating condition storing module 205 in order of higher priority. In this comparison, if there is a rule adding condition agreeing with the attribute (YES), the processing proceeds to step S507. In the other case (NO), the processing proceeds to step S505.

If the classifying rule adding condition (concretely, the condition in each of the first condition column 310, operation column 315 and second condition column 320) is found, the rule creating module 204 reads, from the rule creating condition storing module 205, the classifying rule corresponding to the rule ID acquired in step S501. The rule creating module 204 applies the setting contents of the agreeing condition (concretely, contents of the setting content column 330) to the read classifying rule thereby to create a new classifying rule.

For example, the classifying rule to be create is as follows. The distributing condition is "FAX number is '11-222-3333' AND the text recognition result contains "urgent". The distributing destination is "folder storage in the sub-folder created with the name of '11-222-3333', and mail sending to bbb@xxx with the appendix".

In step S507, the rule creating module 204 adds the new classifying rule thus created in the rule storing module 206. The rule creating module 204, after having added the classifying rule, transmits a rule changing notice to the processing module 203. The processing module 203 reads the added classifying rule from the rule storing module 206, and executes the classifying processing from the part of the added classifying rule.

Further, where a list of the classifying rules is displayed, in order to distinguish the created classifying rule from the old classifying rule, the rule display module 207 displays the created classifying rule equipped with a mark so that it may be known that the classifying rule has been newly created in the computer 200.

Figure 6:
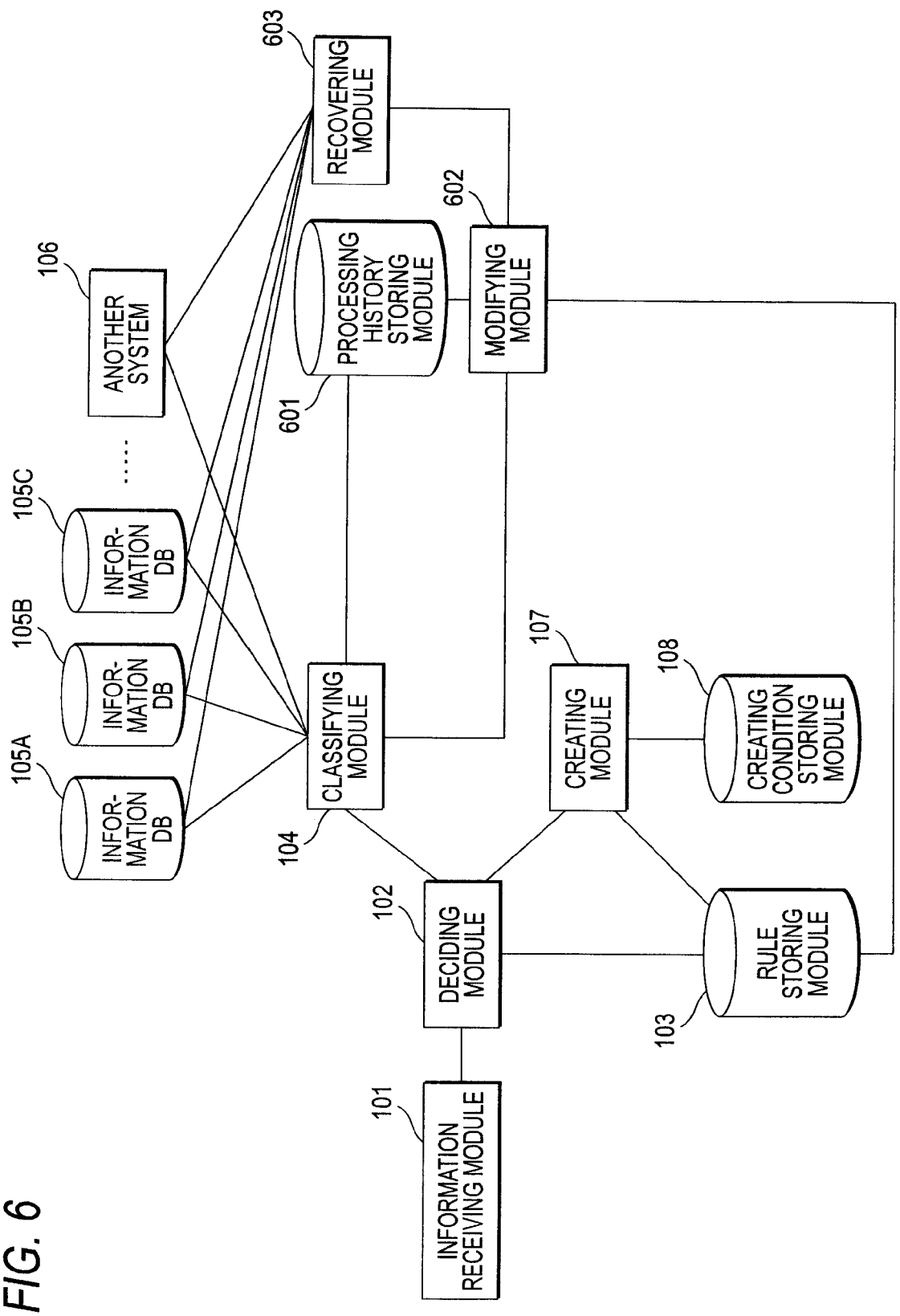
FIG. 6 is a conceptual module configuration diagram of a configuration example according to the second exemplary embodiment.

FIG. 6 is a conceptual module constitution view of the configuration of a configuration example according to the second exemplary embodiment.

In the second exemplary embodiment, a processing history storing module 601, a modifying module 602 and a recovering module 603 are added to the first exemplary embodiment. In the second exemplary embodiment, like reference numerals refer to like modules in the first embodiment to suppress repetitive explanation, but the modules relative to the processing history storing module 601, modifying module 602 and recovering module 603 will be explained.

The module configuration according to the second exemplary embodiment, as shown in FIG. 6, includes the information receiving module 101, deciding module 102, rule storing module 103, classifying module 104, information DB 105A,B and C, other system 106, creating module 107, creating condition storing module 108, processing history storing module 601, modifying module 602 and recovering module 603.

The classifying module 104 is connected to the deciding module 102, information DB 105A, information DB 105B, information DB 105C, another system 106, processing history storing module 601 and modifying module 602. The classifying module 104 classifies the pieces of information received by the information receiving module 101 based on the classifying rule created by the creating module 107. The classifying module 104 causes the processing history storing module 601 to store the history of the classifying processing.

After the piece of information has been classified by the classifying module 104 as described above, where the classifying rule is modified by the modifying module 602, the classifying module 104 re-classifies the pieces of information received by the information receiving module 101 based on the history of the classifying processing stored in the information receiving module 101 and modified classifying rule.

The rule storing module 103 is connected to the deciding module 102, creating module 107 and modifying module 602 and stores the classifying rule modified by the modifying module 602.

The processing history storing module 601 is connected to the classifying module 104 and modifying module 602 and stores the history of the classifying processing by the classifying module 104 and the history of modification of the classifying rule by the modifying module 602.

The modifying module 602 is connected to the rule storing module 103, classifying module 104, processing history storing module 601 and recovering module 603, and modifies the classifying rule created by the creating module 107 according to the operation by an operator. The modifying module 602 causes the rule storing module 103 to store the classifying rule after modified. The modifying module 602 causes the processing history storing module 601 to store the modifying history.

The recovering module 603 is connected to the information DBs 105A, 105B and 105C, other system 106 and modifying module 602 and recovers the classifying processing by the classifying module 104 based on the classifying rule before modifying. Namely, for the purpose of recovering, the recovering module 603 issues a command such as information deletion to the information DBs 105A, 105B, 105C and other system 106.

The more concrete configuration of the second exemplary embodiment is the same as that described referring to FIG. 2. Namely, the processing module 203 executes the processing also relative to the processing history storing module 601, modifying module 602 and recovering module 603.

Figure 7:
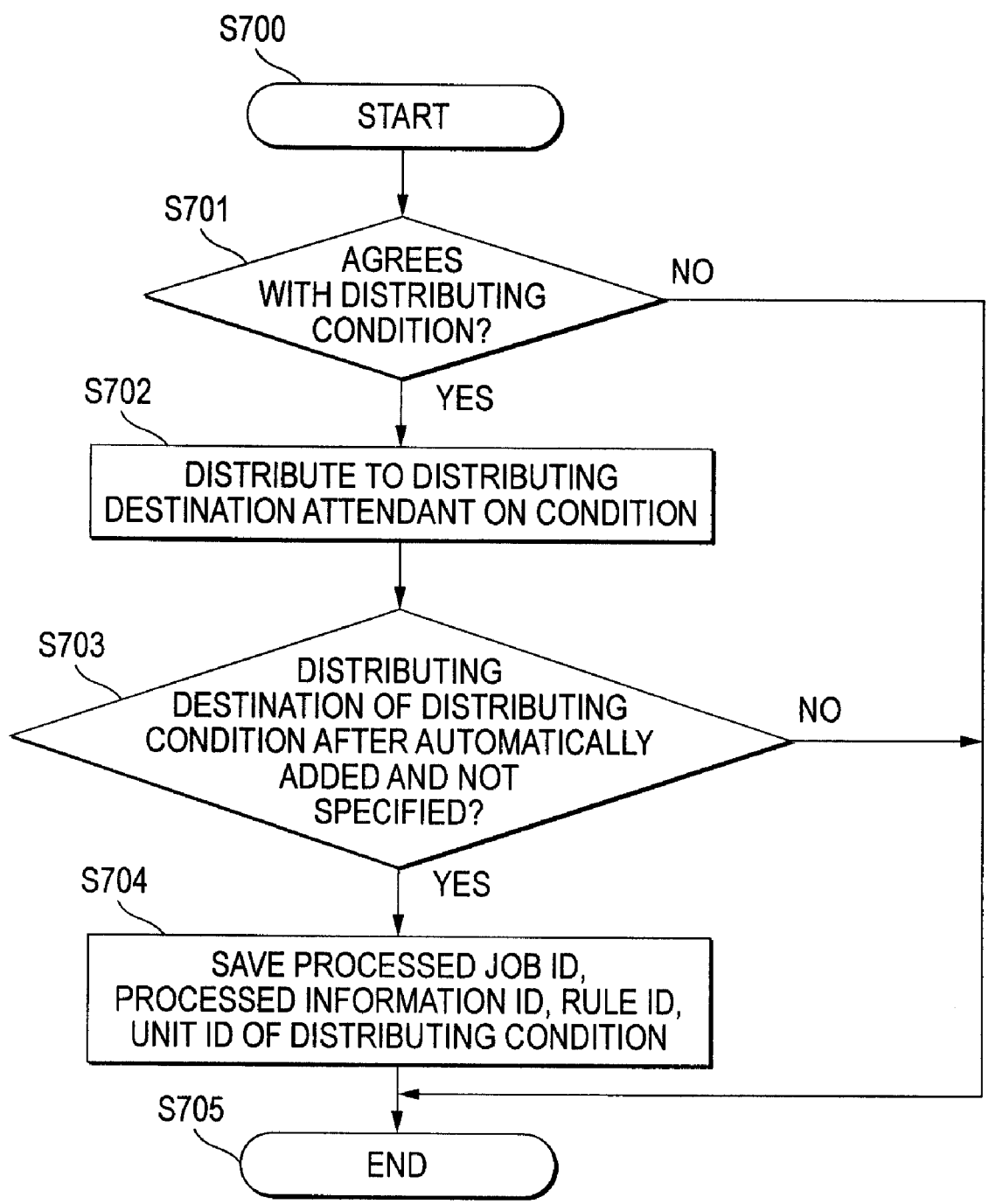
FIG. 7 is a flowchart showing a processing example according to the second exemplary embodiment.
Figures 8, 9:
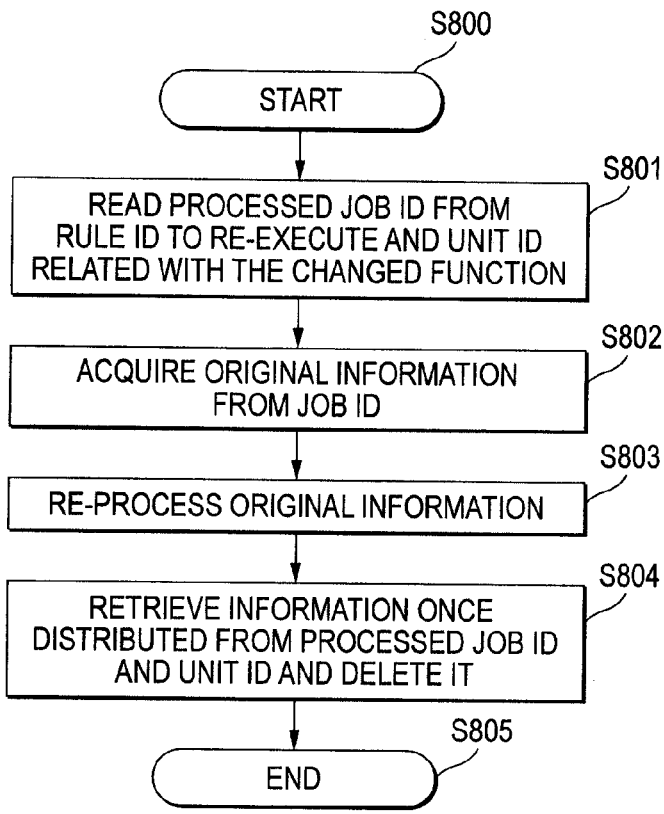
FIG. 8 is a flowchart showing a processing example according to the second exemplary embodiment.
FIG. 9 is a view for explaining an example of the data structure in a saving ID table.

Next, referring to FIGS. 7 and 8, the function and operation of the second exemplary embodiment will be explained.

First, referring to the flowchart shown in FIG. 7, an explanation will be given of the processing before the classifying rule created by the computer 200 is modified.

In step S701, the processing module 203 decides whether or not the inputted job agrees with the distributing condition of the classifying rule. If the job agrees with the distributing condition (YES), the processing proceeds to step S702. In the other case (NO), the processing ends (step S705).

In step S702, the processing module 203 executes the classifying processing based on the classifying rule. Namely, the processing module 203 distributes the picture to the distributing destination attendant on the condition.

In step S703, through the operation by the operator, the processing module 203 decides whether or not the classifying rule created by the rule creating module 204 in the computer 200 is not specified. If not specified (YES), the processing proceeds to step S704. In the other case (NO), the processing ends (step S705).

In step S704, the processing module 203 causes the processing history storing module 601 to store the job ID and others of the job processed according to the classifying rule created by the rule creating module 204.

Now, referring to FIG. 9, an explanation will be given of the data stored in the processing history storing module 601 as the processing history. A saving ID table 900 is stored in the processing history storing module 601.

The saving ID table 900 includes an added-but-not-specified rule ID column 901, a unit ID column 902, a job ID column 903, an information ID column 904, a distributing destination column 905, and an information column 906 in distribution. The contents of the added-but-not-specified rule ID column 901 include the identifier of the classifying rule created by the rule creating module 204 in which the modification or confirmation by the modifying module 602 is not completed. The contents of the unit ID column 902 include the identifier allotted to each function such as folder saving or mail sending and may include plural unit IDs for a single rule ID. The contents of the job ID column 903 include the identifier of the job having executed the classifying rule. The contents of the information ID column 904 include the identifier the piece of information subjected to the processing by the classifying rule. The contents of the distribution destination column 905 include the distributing destination to which the piece of information has been distributed according to the classifying rule. For example, it is the folder in the PC210 and others. The contents of the information column 906 in distribution include the information name at the distributing destination of the information distributed according to the classifying rule. This information name is employed in the recovery.

Next referring to the flowchart shown in FIG. 8, an explanation will be given of the re-processing after the classifying rule created in the computer 200 has been modified.

First, through the operation by the operator, the modifying module 602 modifies the classifying rule with the mark indicative of that the classifying rule is not specified. The object to be modified is the function such as the folder saving 402 and the mail notice 403. For example, the name of the sub-folder is changed. The operator instructs re-execution.

In step S801, the processing module 203 reads the processed job ID based on the rule ID of the modified classifying rule to re-execute (added-but-not-specified rule ID column 901) and the unit ID related to the changed function (unit ID column 902) from the processing history storing module 601. Namely, the processing module 203 extracts the job ID based on the added-but-not-specified rule ID and the unit ID and specifies the part to be re-executed.

In step S802, the processing module 203 acquires, based on the job ID extracted in step S801, the original information specified by the identifier which is the contents of the information ID column 904 (picture data first inputted by the picture input module 201).

In step S803, the processing module 203 re-executes the classifying processing for the original information acquired in step S802 according to the modified classifying rule.

In step S804, based on the processed job ID and unit ID, the recovering module 603 retrieves the piece of information previously distributed as the classifying processing from the information IDs 105A, 105B and 105C and other system 106, and deletes the information. Namely, the information once processed is deleted. For example, the information at the folder with the old sub-folder name (name of the sub-folder set in the classifying rule before modified) is deleted.

Further, the rule display module 207, because it may be assumed that the classifying rule has been specified after the setting contents are confirmed and changed, deletes the mark put to the classifying rule.

The order of executing the processing in step S803 and step S804 may be inverted. Namely, after the information once processed is deleted, the classifying processing may be re-executed according to the modified classifying rule.

The job of the classifying rule newly created by the rule creating module 204 may be stopped temporarily until the confirmation is executed. In this case, the processing in step S804 is not needed.

Figure 10:
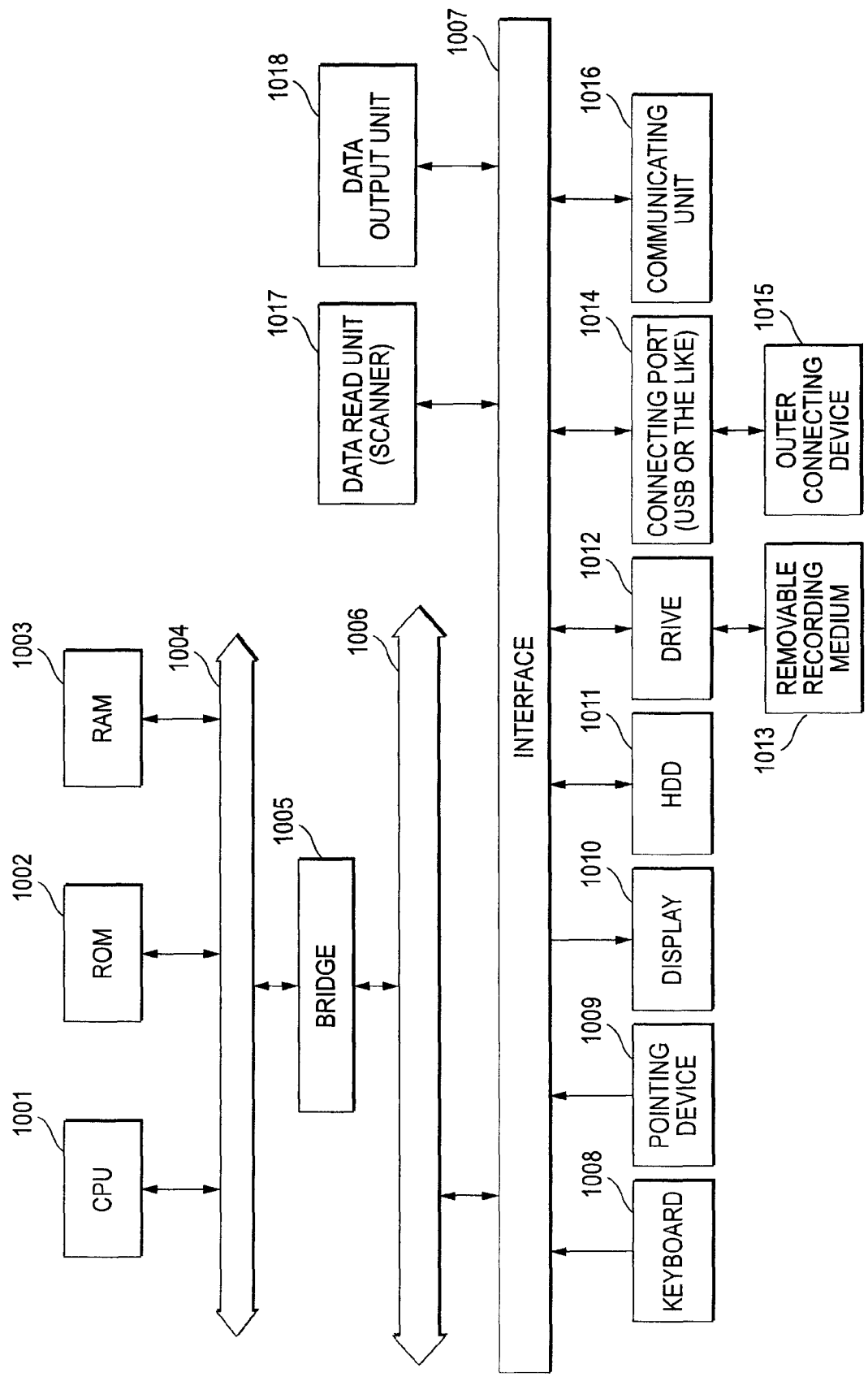
FIG. 10 is a block diagram showing a hardware configuration example of the computer realizing the exemplary embodiments.

Referring to FIG. 10, an explanation will be given of a hardware configuration of the embodiments described above. The hardware configuration shown in FIG. 10 is configured by e.g. a personal computer (PC) and includes a data read unit 1017 such as a scanner and a data output unit 1018 such as a printer.

In the hardware configuration shown in FIG. 10, a CPU (Central Processing Unit) 1001 is a control unit which executes the processing according to the computer program which describes an execution sequence of each of the various modules explained with reference to the embodiments described above, i.e. deciding module 102, creating module 107, modifying module 602 and recovering module 603.

A ROM (Read Only Memory) 1002 stores the programs and operation parameters employed by the CPU 1001. A RAM (Random Access Memory) 1003 stores the program executed in the CPU 1001 and the parameter appropriately changed in the execution of the program. These memories are interconnected via a host bus 1004 such as a CPU bus.

The host bus 1004 is connected to an outer bus 1006 such as a PCI (Peripheral Component Interconnect/Interface) bus via bridge 1005.

A key board 1008 and a pointing device 1009 such as a mouse are input devices operated by the operator. A display 1010 is a liquid crystal display or a CRT (Cathode Ray Tube) which displays various kinds of information as a text or image information.

An HDD (Hard Disk Drive) 1011 incorporates a hard disk and drives the hard disk to record or reproduce the program and information executed by the CPU 1001. The hard disk stores the information received by the information receiving module 101 and data of a character string as the character recognition result. The hard disk also stores various kinds of computer programs such as other kinds of data processing programs.

A drive 1012 reads the data or programs recorded in a removable recording medium 1013 such as a mounted magnetic disk, optical disk, magneto-optic disk or semiconductor memory and supplies the data or programs to the connected RAM 1003 via the interface 1007, outer bus 1006, bridge 1005 and host bus 1004. The removable recording medium 1013 may be employed as the same data recording region as the hard disk.

A connecting port 1014 is a port connected to an outer connecting device 1015 and has a connecting piece such as a USB or IEEE1394. The connecting port 1014 is connected to the CPU 1001 and others via the interface 1007, outer bus 1006, bridge 1005 and host bus 1004. A communicating unit 1016 is connected to a network to execute the data communicating processing with the outside. A data reading unit 1017 is for example, a scanner which executes the reading processing of the document. A data outputting unit 1018 is for example a printer which executes the outputting processing of the document data.

The hardware configuration shown in FIG. 10 is a typical configuration example. The hardware configuration in this embodiment should not limited to the configuration shown in FIG. 10 as long as it may execute the modules explained with reference to the embodiments described above. For example, some modules may be dedicated hardware (for example, an application specific integrated circuit (ASIC)); and some modules may be located within an external system connected through a communicating line. Plural systems as shown in FIG. 10 may be connected to one another to perform a cooperative operation with each other. The hardware configuration may be built in a copier, FAX, scanner, printer, multifunction printer (i.e. an image processor having two or more functions of the scanner, printer, copier and FAX).

In the embodiments described above, the data structure in FIGS. 3, 4(A-B) and 9 may be replaced by the other data structure. For example, the data structure may be a link structure. The data items should not be limited to those illustrated and may include other data items.

The program described above may be stored in the recording medium or may be provided by a communicating section. In this case, the program described above may be understood as an invention of a "program-recorded computer-readable recording medium", for example.

"The program-recorded computer-readable recording medium" refers to a program-recorded computer-readable recording medium which is employed for the install, execution, distribution of the program.

The recording medium may be, for example, a digital versatile disk (DVD) including "DVD-R, DVD-RW, DVD-RAM, etc" standardized by the DVD forum and "DVD+R, DVD+RW, etc. standardized by the DVD+RW forum); a compact disk (CD) including a read-only-memory (CD-ROM), a CD recordable (CD-R), a CD rewritable (CD-RW); a magneto-optic disk (MO); a flexible disk (FD); a magnetic tape; a hard disk; a read-only memory (ROM), an electrically erasable programmable read-only-memory (EEPROM); a flash memory; or a random access memory (RAM).

The program described above or a part thereof may be saved or distributed as a form recorded in the recording medium. It may be also transferred by means of communication, for example, an cable network adopted in a local network (LAN), a metropolitan area network (NAN), a wide area network (WAN), an internet, an intranet, an extranet; a wireless communication network; or their composite transfer medium. They may also be transferred on a carrier wave.

Further, the program described above may be a part of the other program or recorded together with another program in the recording medium. The program may be recorded in plural recording media in a divided manner. Further, the program may be recorded in any format inclusive of compression and encryption as long as it cans be reconstructed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information classifying apparatus comprising:
    an information receiving section that receives an electronic document to be distributed by the information classifying apparatus, the electronic document having an attribute comprising a distribution destination to which the electronic document is to be distributed by the information classifying apparatus;
    a rule storing section that stores a classifying rule that indicates a distribution method to be applied to electronic documents received by the information classifying apparatus, the classifying rule comprising a classifying attribute, and a destination to which the electronic documents received by the information classifying apparatus are to be distributed;
    a deciding section that determines whether the attribute of the electronic document matches the classifying attribute of the classifying rule stored in the rule storing section;
    an additional rule storing section that stores an additional rule along with a priority indicating an addition order of the new classifying rule;
    a rule addition section that adds the additional rule stored in the addition rule storing section into the rule storing section in accordance with the priority when the deciding section determines the attribute of the electronic document does not match the classifying attribute of the classifying rule stored in the rule storing section; and
    a transmitting section that transmit the electronic document in accordance with the destination indicated by the classifying rule when the deciding section determines the attribute of the electronic documents matches the classifying attribute of the classifying rule stored in the rule storing section,
    wherein the determination by the deciding section is performed while taking into consideration both the classifying rule and the additional rule when the additional rule is added into the rule storing section.

2. The information classifying apparatus according to claim 1, further comprising:
    a first classifying section that classifies the electronic document based on the new classifying rule;
    a history storing section that stores a classifying history executed by the first classifying section; and
    a second classifying section that classifies, in response to the first classifying section classifying the electronic document, when the new classifying rule created by the creating section is modified according to an operation by an operator, the electronic document based on the classifying history and the modified new classifying rule.

3. The information classifying apparatus according to claim 2, further comprising a recovering section that recovers the classifying processing executed by the first classifying section.

4. An information classifying method comprising:
    receiving an electronic document having an attribute comprising a distribution destination to which the electronic document is to be distributed;
    storing in a rule storing section a classifying rule that indicates a distribution method to be applied to received electronic documents, the classifying rule comprising a classifying attribute and a destination to which the received electronic documents are to be distributed;
    determining, by a processor, whether of the attribute of the electronic document matches the classifying attribute of the classifying rule stored in the rule storing section;
    storing in an additional rule storing section an additional rule along with a priority indicating an addition order of the new classifying rule;
    adding the additional rule stored in the addition rule storing section into the rule storing section in accordance with the priority when the deciding section determines the attribute of the electronic document does not match the classifying attribute of the classifying rule stored in the rule storing section; and
    transmitting the electronic document in accordance with the destination indicated by the classifying rule when the deciding section determines the attribute of the electronic documents matches the classifying attribute of the classifying rule stored in the rule storing section, wherein the determining is performed while taking into consideration both the classifying rule and the additional rule when the additional rule is added into the rule storing section.

5. The information classifying method according to claim 4, further comprising:

classifying the electronic document based on the new classifying rule;

storing a classifying history of the classifying the first electronic document; and reclassifying, in response to classifying the electronic document, when the new created classifying rule is modified according to an operation by an operator, the electronic document based on the classifying history and the modified new classifying rule.

6. The information classifying method according to claim 5, further comprising:

recovering the executed classifying processing.

7. A non-transitory computer readable medium storing a program causing a computer to execute an information processing method, the method comprising:

receiving an electronic document having an attribute comprising a distribution destination to which the electronic document is to be distributed;

storing in a rule storing section a classifying rule that indicates a distribution method to be applied to received electronic documents, the classifying rule comprising a classifying attribute and a destination to which the received electronic documents are to be distributed;

determining, by a processor, whether the attribute of the electronic document matches the classifying attribute of the classifying rule stored in the rule storing section;

storing in an additional rule storing section an additional rule along with a priority indicating an addition order of the new classifying rule;

adding the additional rule stored in the addition rule storing section into the rule storing section in accordance with the priority when the deciding section determines the attribute of the electronic document does not match the classifying attribute of the classifying rule stored in the rule storing section; and transmitting the electronic document in accordance with the destination indicated by the classifying rule when the deciding section determines the attribute of the electronic documents matches the classifying attribute of the classifying rule stored in the rule storing section, wherein the determining is performed while taking into consideration both the classifying rule and the additional rule when the additional rule is added into the rule storing section.

8. The non-transitory computer readable medium according to claim 7, the process further comprising:

classifying the electronic document based on the new classifying rule;

storing a classifying history of the classifying the first electronic document; and reclassifying, in response to classifying the electronic document, when the new created classifying rule is modified according to an operation by an operator, the electronic document based on the classifying history and the modified new classifying rule.

9. The non-transitory computer readable medium according to claim 8, the process further comprising:

recovering the executed classifying processing.

10. The information classifying apparatus according to claim 1, further comprising:

a confirmation section that detects a confirmation of the new classifying rule by a user; and a control section that halts a classifying process based on the new classifying rule until the confirmation is detected.

11. The information classifying method according to claim 4, further comprising:

detecting a confirmation of the new classifying rule by a user; and halting a classifying process based on the new classifying rule until the confirmation is detected.

* * * * *